United States Patent [19]
Vladimir et al.

[11] Patent Number: 5,739,769
[45] Date of Patent: Apr. 14, 1998

[54] METHOD OF INTELLIGENCE SUPPORT OF AIRCRAFT CREW

[75] Inventors: Ziberov A. Vladimir; Koupziyanov V. Alexander, both of Moscow Region; Kosolapov A. Oleg, Moscow, all of Russian Federation

[73] Assignee: Anita Trotter-Cox

[21] Appl. No.: 520,265

[22] Filed: Aug. 28, 1995

[51] Int. Cl.[6] .................................................. G08B 21/00
[52] U.S. Cl. ...................... 340/945; 340/971; 364/424.06
[58] Field of Search ................................ 340/945, 946, 340/963, 971, 961; 364/424.06, 424.03, 424.12, 424.34

[56] References Cited

U.S. PATENT DOCUMENTS

| | | |
|---|---|---|
| 3,017,609 | 1/1962 | Ritchie ........................... 340/971 |
| 3,582,949 | 6/1971 | Forst ............................. 340/945 |
| 4,970,683 | 11/1990 | Harshaw et al. ............... 364/424.06 |
| 5,267,147 | 11/1993 | Harshaw et al. ............... 364/424.06 |
| 5,339,244 | 8/1994 | Stiles, Jr. et al. ............. 340/945 |
| 5,475,594 | 12/1995 | Oder et al. .................... 340/971 |
| 5,522,026 | 5/1996 | Records et al. ................ 340/945 |

*Primary Examiner*—Brent A. Swarthout
*Attorney, Agent, or Firm*—Rines & Rines

[57] ABSTRACT

A novel intelligence support of an aircraft crew and the like embodying videocards with pictogram signs indicating corrective action to be taken by the crew for emergency flight situations and monitoring the achieving of such corrective action.

3 Claims, 4 Drawing Sheets

METHOD OF INTELLIGENCE SUPPORT OF AIRCRAFT CREW

The present invention relates to intelligence support expert systems (ISS) for use by operators of complex human-machine-space systems, including aircraft crew members (ACM) and leaders of airfield flight control (LFC); being more particularly concerned with providing necessary information for dealing clearly with emergency flight situations.

BACKGROUND OF INVENTION

This invention describes a novel method of providing information to aircraft crew members and flight control personnel during emergency flight situations (EFS). The invention is based on the task of providing intelligence support for the aircraft crew for diagnosis and checking workability and functionality of aircraft and systems and subsystems automatically, if emergency flight situations appear; providing visual perception of necessary informational support of ACM for eliminating EFS.

An analysis of causes of flight accidents demonstrates that flight safety is much influenced by the quality of information being given to aircraft crews. This problem comes out especially timely as the "glass" cockpit becomes more widely implemented because an effort to squeeze vast amounts of information into a limited surface area of electronic indicates instigates a serious problem of difficulty of perception and is accompanied by insufficient scope of research work in the approaches to encoding of this information.

To solve it, the invention uses a fragmentary-pictographic method of information presentation as a principle of designing the interface of the aircraft intelligence support system. Such fragmentary-pictographic interfacing is an essentially more adequate instrument considering its correspondence to inner (psychological) toolset of mental activity as a whole and of the operator in particular.

In accordance with the invention, this information support is illustrated for each crew member with appropriate prompts in time and form that allow each to understand the intelligence and use it and in shortest format. Also, it controls operations of each crew member and immediately warns them of mistakes (by "feedback"). This method includes measuring and processing of flight information, for presentation on screens in "videocard" form, divided on four information fields (IF).

For example, a left IF introduces the information about the type of EFS. A right upper IF may point out which of the crew members must operate. A central upper IF may indicate necessary conditions to eliminate EFS. All such information is introduced in a system of pictogram signs and connected elements-functional lines such as "to do", "to check", "to wait" as later more particularly described in connection with later-described FIG. 4.

This invention is thus a part of an intelligence support system (ISS) of work of complete human-machine-space system operators. It regulates the activity of aircraft crew members (ACM) and airfield flight control leaders (LFC). This invention describes the method interfacing with aircraft crew members (ACM) and airfield flight control leaders (LFC). In addition to providing information for treating with emergency flight situations (EFS), the invention also may be used in other areas of human activity where complex operation and technologies are involved.

Underlying the invention is an expert system of pictograms to help the pilot of, for example, a helicopter or other craft to accomplish safey flight regimes by checking weight, balance, torque moment during flying with the cargo on the external suspension and inside the fuselage of the helicopter.

Previously known methods have been based on the measuring of flight information, calculation, and showing on the pilot's screen of information about needing engine thrust (power) in different flight conditions according to flight weight and inside cargo, stored into random access memory (RAM) of an onboard computer, and information about ambient temperature and fuel quantity which are also inputted to the computer by the pilot.

By command of the pilot, such systems show on the screen information about fuel quantity, flight altitude, condition of anti-ice system and cargo weight on each of 3 external suspensions. Also the information about flight weight, center of gravity, reserve quantity of fuel, engine type, etc., is inputted manually into random access memory of the computer and may be recovered by the pilot if such is necessary.

The main drawbacks of such prior methods are:

many operations must be done with the control unit of the computer through introducing necessary information by the pilot, such being unacceptable during the flight with EFS;

non-optimal method of introducing information to crew in letter and digit form, requiring too much time for proper understanding;

no options for an expert system to control correct operations of the pilot.

OBJECTS OF INVENTION

The primary object of the invention, accordingly, is to provide a novel method and system of intelligence support for the aircraft crew or flight control personnel that shall not be subject to the above-described disadvantages and others of prior methods, but to the contrary, provide advancement of safety in flight by raising the efficiency of perception and display of information, with reduction of the probability of wrong crew operations and providing a check of the crew's actions to eliminate EFS.

A further object is to provide such improvement with the aid of user friendly pictograms or icons operated under appropriate computer control.

Other and further objects will be explained hereinafter and pointed out in connection with the appended claims.

SUMMARY

In summary, however, the invention embraces a method of intelligence support of an aircraft crew and the like based on measuring flight information and inputting the same to an onboard computer operating with special software, that comprises, coding emergency flight situations information by pictogram signs for display; downloading the same to the memory of the computer and comparing the same with the measuring of flight information in an emergency flight situation; and displaying to the crew members as videocards, the pictogram signs, with successive videocards being introduced only if all operations or instructions according to the previous videocard were successfully fulfilled; and, if such operations were wrongly made, presenting to the crew members from the computer, information as to what kind of mistake was made, who did it, and how to correct the mistake. Preferred designs and modes of operation are hereinafter more fully described.

DRAWINGS

The invention will now be explained in connection with the accompanying drawings.

FIG. 1 of which shows a block-diagram of a system utilizing the method of the invention;

DESCRIPTION OF PREFERRED EMBODIMENT(s) OF INVENTION

The before-described intelligence support of the aircraft crew is based on measuring flight information, down-loaded to the onboard computer (BC) or processor 1 and treated according to a special program. All EFS are coded, using pictogram signs and are preinstalled to energy independent read only memory (ROM) of the computer. The measured flight information is analyzed by the BC, and if EFS is occurring, the BC introduces on the display, information about the subsequent operations of crew members to eliminate the EFS.

This information, in accordance with the invention, appears in "videocard" form. Each successive or following videocard shows only after the correct accomplishing of the necessary operations which were indicated or shown on the previous videocard. If the subsequent operation or the operation fulfillment is wrong, information appears as to what is the mistake, who did it, and how to correct it. The information on the screen is provided and shown by the system of the before-mentioned pictograms (icon) signs and special functional lines; such as "to do", "to check", "to wait".

Figure 1:
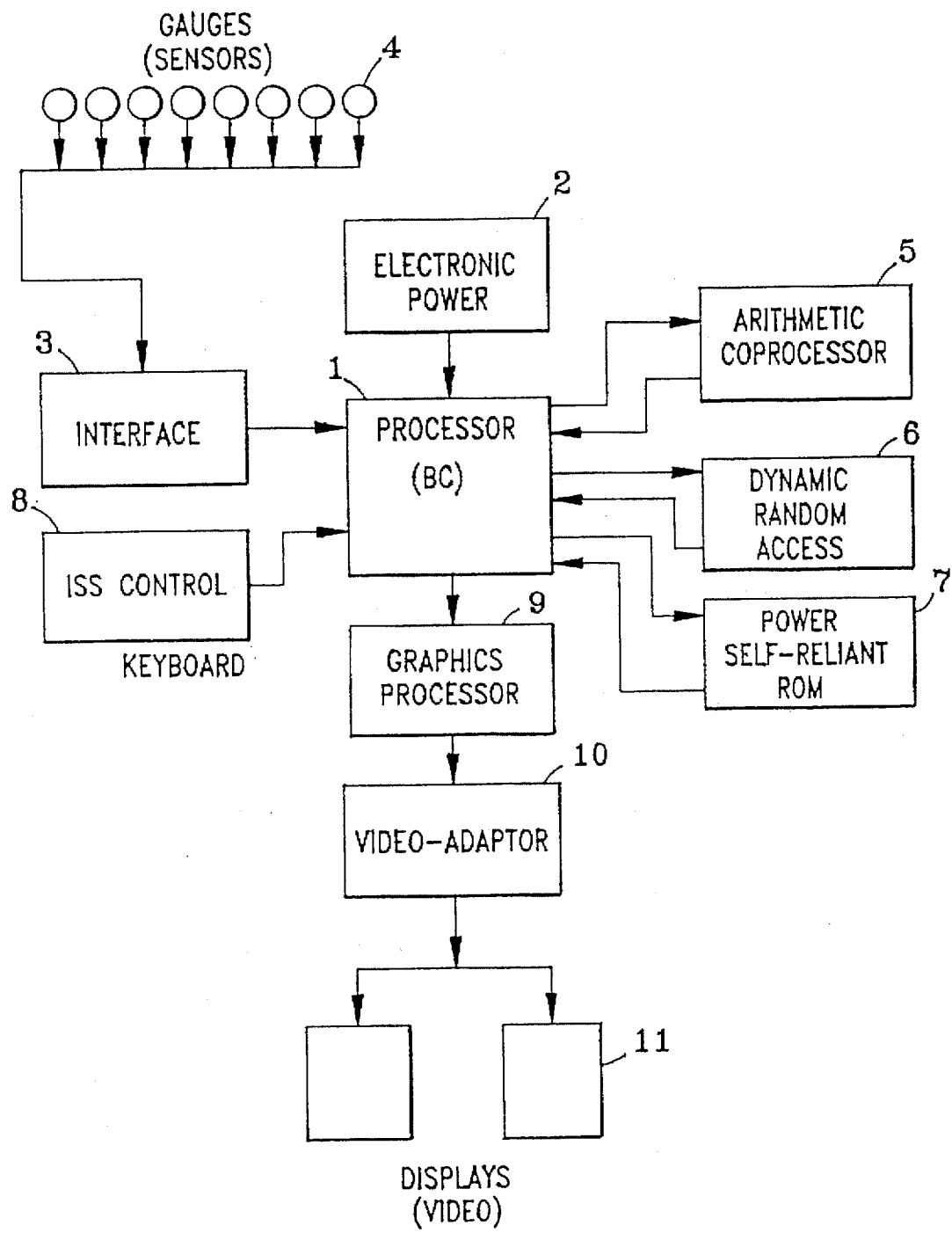

The block-diagram FIG. 1 includes a processor 1 or onboard computer (BC) which is energized by a power-module 2. Information from the aircraft system and sub-system sensors 4 is transmitted into the processor 1 through an interface module 3 that consists of a multiplex analog-digital converter or transformer and a multiplex digital transformer. The output of the processor 1 is fed back by connection with floating point unit 5, random access memory 6 and energy-independent read only memory 7. The processor is also connected with a module 8 of the control unit ISS which consists of a keyboard, code keyboard and graphic processor 9. The graphic processor is connected with a video adapter 10 which is connected with displays 11 at the "glass" cockpit working places of the crew members.

Figure 2:
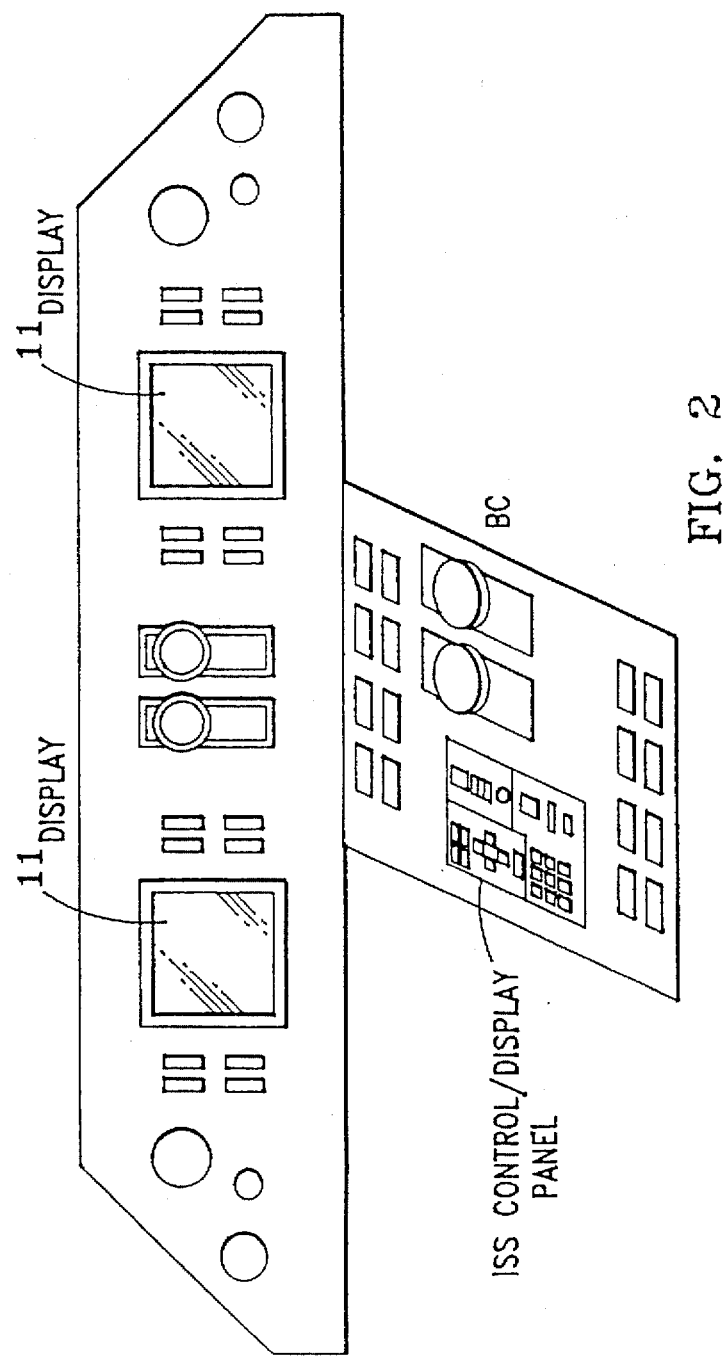
FIG. 2 illustrates the "glass" cockpit of an aircraft with screens and a control unit of the intelligence support system (ISS)

Such a glass cockpit includes the pilot's working station having displays so-labeled in FIG. 2; one on the front control panel and one on the horizontal control panel of the ISS between the pilot's and the co-pilot's seats.

The control unit (FIG. 3) consist of three functional fields. There are light-knobs 12 for "Switch on" and 13 for "Auto-Manual", and a display brightness regulator 14, all on the right upper functional field (FF). There are knobs 15 for "Test", 16 for "Menu", 17 for "Return", 18 for "Continue", 19 for "Output", and 20 for "Input" on the left upper field, FF[1]. There are knobs from "0" to "9", knobs for 21 "Fuel/Cargo" and 22 for "Cancel" on the lower FF[11].

Figure 4:
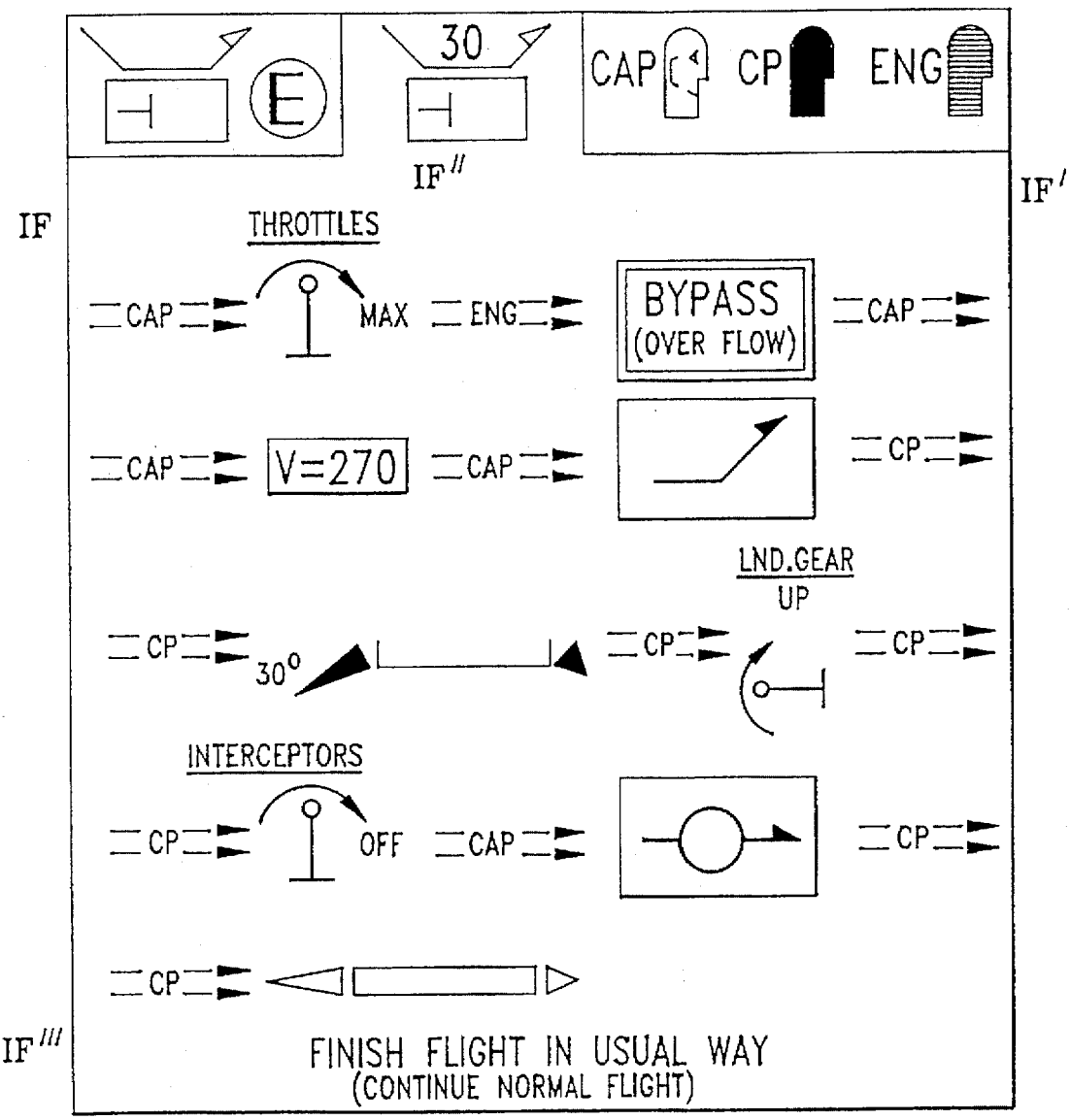
FIG. 4 is an external view of a videocard as presented or shown to the aircraft crew prompting appropriate illustrative EFS operation such as "Go-around with one failed engine".

An example of information provided for the crew is shown in FIG. 4; i.e. the before-mentioned instruction "Go-around with one failed engine". Information about the type of EFS is shown on the left upper information field (IF). Information as to the appropriate crew member who has the duty to operate in this EFS, is shown on the right upper IF'. Information about the necessary conditions for realizing this flight regime is then shown on the central upper IF". Information about the necessary operations and their sequence to accomplish this flight regime is shown on the lower IF'".

The description of the operation of the method of the invention for this illustrative example is stated below.

Figure 3:
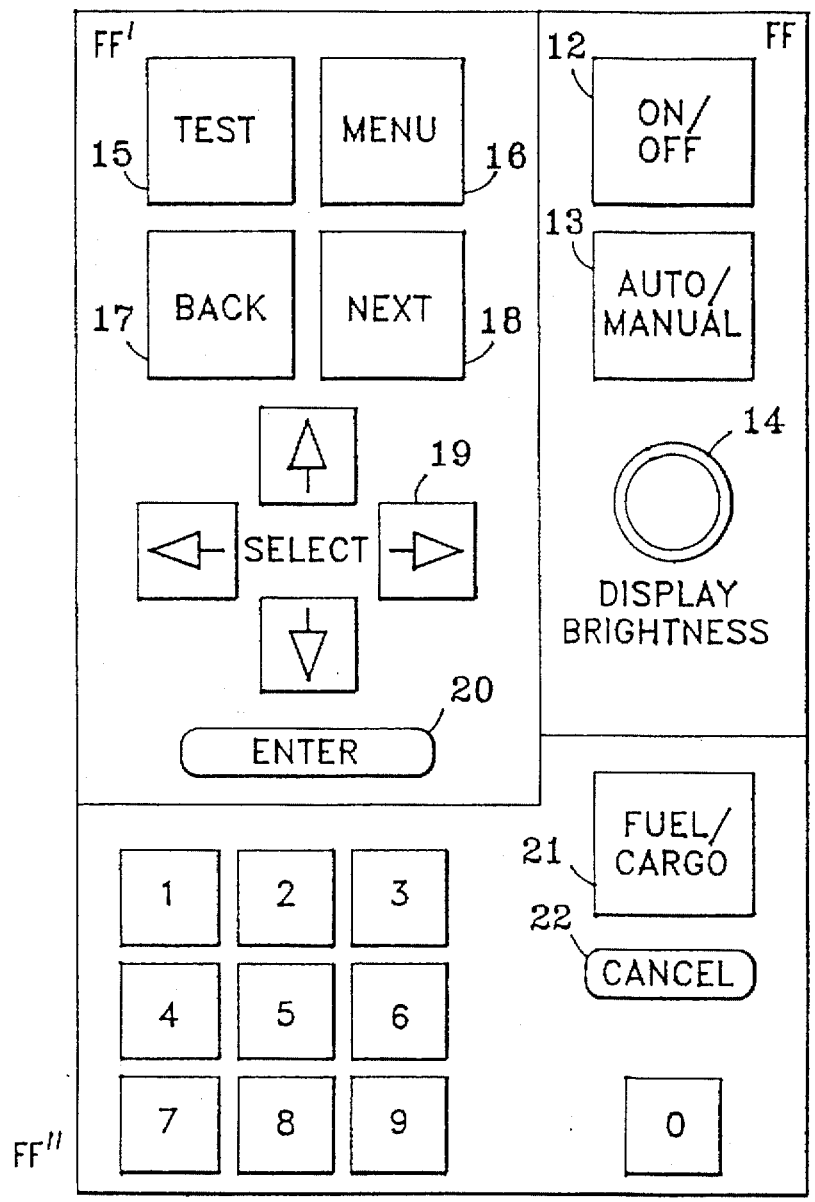
FIG. 3 is a view of the control unit of the ISS.

Before take-off, the pilot pushes knob 12 "Switch On" (FIG. 3). ISS is then inserted. The green light "Switch On" on light-knob 12 turns on. The green light for "Auto-Manual" on light-knob 13 also turns on.

The following information is downloaded to random access memory of the on board computer (BC) after ISS turns on:

fuel weight weight and location of cargo inside and outside of fuselage.

The total fuel weight is down-loaded manually if the aircraft is not fueled.

During flight, the BC calculates the remainder of fuel according to fuel-sensor information that allows BC to provide to the crew members the flight weight and balance at any time, and especially during EFS, if such occurs.

The knob 21 "Fuel/Cargo" changes the type of information input to BC using a keyboard shown at the lower functional field of the control display of ISS. The proper green light indicator will appear. It is then necessary to push the light-knob 21 to change the regime of work. The screen of the aircraft is shown on the display with messages such as "Input fuel weight at fuel tanks" or "input cargo weight and its location". The location of fuel and cargo is determined by a screen pointer using knobs 19 "Choice" and 20 "Enter", FIG. 3. The digital meaning is entered by the keyboard and an "Enter" knob. The incorrect or wrong entered weight of fuel and cargo or cargo location may be corrected by using knobs 19 "Choice" and 20 "Cancel". To do this the pointer is moved by knob 19 "Choice" to change data, and the incorrect data is deleted by knob 22 "Cancel". New proper information of fuel or cargo weight is then inputted if necessary.

If EFS appears, for example, "Engine's failure", the information of that failure is transferred from sensor 4, FIG. 3, that located the failed engine, to BC (1). The BC identifies and transforms it using special software, with all necessary information introduced on the crew members' working place displays.

All necessary information about EFS remains stored in the energy-independent read only memory in module 7. When EFS appears and is identified, the information about this EFS is downloaded to cache-module 6 of the RAM for fast access, and such is stored there until the EFS is eliminated. During EFS elimination, the data of RAM only is used by BC (1).

When a request for information ("help") is displayed at the screen 11, FIG. 1, ISS begins to work its regime.

At "Control", each operation which was done in response to appropriate sensor signals is recorded and sent to BC (1) where it is transformed. When the operation indicated by "help" has been done properly, the information about that operation disappears from the displays through introducing the named "dynamic help line". If a crew member makes all the necessary operations successfully, then the pictogram sign that signaled this crew member disappears from the right upper information field (IF) of videocard, FIG. 4, after the last successfully fulfilled operation is effected by this crew member.

If anybody from the crew performed a wrong operation (for example, flight engineer (FE) didn't shut off HP fuel valve on failed engine), then on the screens, there will immediately appear information (videocard) as to which operation is wrong and how it must be properly done (shut off HP fuel valve). After correct operation, the ISS continues to show information about the next operation.

After accomplishing all necessary operations according to this an actual EFS, the RAM of BC and screens 11 are cleared of the used information. Then, the system is returned to the stand-by or "idle" condition with reset by special software.

The manual regime of ISS work is used in case of broken connection lines, with sensors 4 located at the systems and subsystems of the aircraft or during crew training, to operate in EFS; or when ISS is used at the working place of LFC (leader of airfield flight control). To switch ISS to such a manual regime, it is necessary to turn on ISS by pushing knob 12 on control display unit (FIG. 3), and to switch ISS by operating knob 13 to the "Manual" condition. In this case, a yellow light "Manual" must turn on at the knob 11 and at the crew member's working place displays.

After this, the menu of EFS is stored in the energy-independent ROM and appears on the displays by pushing knob 16 "Menu". The appropriate EFS is chosen by clicking to it using the pointer moved by knob 19 "Choice" and clicked by knob 20 "Enter". All information about the chosen EFS appears on displays 11 as videocards.

The videocard shown in this regime is introduced in static form. To return ISS to normal, the start-up condition is made by pushing knob 16 "test" on left upper information field (IF) of the control display unit. In case there is no present EFS in the menu, a videocard with menu will appear by pushing knob 18 "Continue", etc. A return to the previous videocard with a menu is made by pushing knob 17 "Return".

Return of ISS to automatic regime is made by pushing knob 13 "Auto-Manual" with green light "Auto" turning on the displays, and the videocards with menu disappear from the displays.

The above examples are by way of illustrations only, the invention more generally making it possible now to dramatically ameliorate the crew-caused accidents statistics and to speed up the performance of certain tasks by implementing the newly designed aircraft crew intelligence support system of the invention. The fragmentary-pictographic method used curtails classical (paper) handbook bulk (1.5 to 4 times less), decreases the probability of the erroneous crew actions (2 to 3 times) and is accompanied by simultaneous gain in operational rate of crew performance (1.3 to 2 times faster). The integrated subjective rating by flight crews of this new information technique surpasses the one of traditional (text) mode of information presentation.

Further modifications will occur to those skilled in this art, and such are considered to fall within the spirit and scope of the invention as defined in the appended claims.

What is claimed is:

1. A method of intelligence support and information presentation to an aircraft crew on their actions during in-flight emergency situations, comprising identifying and processing in-flight emergency signals by an on-board computer complex; presenting crew-oriented information on screens of displays in the form of a videocard divided into data fields carrying information about the nature of the in-flight emergency situation, about the crew members to whom the information is addressed, about the tasks to be carried out, and about the mode and order of overcoming the emergency situation, this information being presented as a pattern of pictographic signs and associated functional commands.

2. The method of claim 1 and in which the modes of operation are both manual and automatic; in automatic mode, as emergency, situations are encountered and crew members take actions to overcome the situations, feeding information about the crew actions into the computer complex and then, provided these actions are correct, clearing from the display screens all information concerning said actions; while, if the actions are wrong, presenting upon the screens the information on which crew member has committed an error and the way to correct it; and, after the error is corrected, displaying information about terminating emergency actions.

3. The method of claim 1 and in which a set of videocards is stored in the on-board computer complex, this set being in accordance with the number of expected in-flight emergency situations and the corresponding number of crew errors.

* * * * *